United States Patent [19]

Yamashita et al.

[11] Patent Number: 5,063,548

[45] Date of Patent: Nov. 5, 1991

[54] INFORMATION PROCESSING APPARATUS

[75] Inventors: Hiroshi Yamashita, Kawasaki; Akihiko Doi, Tokyo, both of Japan

[73] Assignee: Kabushiki Kaisha Toshiba, Kawasaki, Japan

[21] Appl. No.: 346,776

[22] Filed: May 3, 1989

[30] Foreign Application Priority Data

May 13, 1988 [JP] Japan ................. 63-116713

[51] Int. Cl.5 ............................. G11B 7/00
[52] U.S. Cl. .................. 369/44.14; 369/32; 369/44.15
[58] Field of Search ........ 369/44.14, 32, 219, 369/221, 133; 250/331.14, 237 G, 100, 44.15

[56] References Cited

U.S. PATENT DOCUMENTS 4,481,613 11/1984 Yokota .
4,583,212 4/1986 Koide et al. .................. 369/221
4,943,166 7/1990 Yamashita ..................... 369/32

FOREIGN PATENT DOCUMENTS 62-137775 of 1987 Japan .

OTHER PUBLICATIONS

German Office Action dated Aug. 29, 1990.
JP 62-137 775A, Patent Abstracts of Japan, Nov. 26, 1987, vol. 11/No. 362 (P-640).
JP 62-47 878 A, Patent Abstracts of Japan, Aug. 4, 1987, vol. 11/No. 236 (P-601).

*Primary Examiner*—Roy N. Envall, Jr.
*Assistant Examiner*—Hindi Nabil
*Attorney, Agent, or Firm*—Finnegan, Henderson, Farabow, Garrett, and Dunner

[57] ABSTRACT

An information processing apparatus includes a main base and a drive base on which support frames are erected to face each other. A pair of parallel guide shafts are supported on the frames and extend in the radial direction of an optical disk. An optical head is supported by the guide shafts to be movable along the shafts. Insulating tape is wound around each end of the guide shaft to electrically insulate the head from the base, thereby preventing external noise from being transmitted to the head via the base. The drive base is further insulated from the main base by insulating seals interposed between the main base and the drive base and by insulating collars through which screws attach the drive base to the main base.

3 Claims, 3 Drawing Sheets

INFORMATION PROCESSING APPARATUS

BACKGROUND OF THE INVENTION

1. Field of the Invention

This invention relates to an information processing apparatus and more particularly to an information processing apparatus for recording and reproducing information by using an optical disk as an information storage medium.

2. Description of the Related Art

Many information processing systems use an optical disk as an information storage medium. Compared with magnetic information processing systems which were previously used, optical disk processing systems have considerable advantages. In particular, the information storage capacity can be greatly increased, and stable information processing can be accomplished with less noise. Moreover, during the information processing operation, there is no contact between the memory medium and the optical head, so that the possibility of damage is reduced. Because of these advantages, disk processing systems are widely used.

U.S. Pat. Application Ser. No. 148,694, filed by the present applicant on Jan. 26, 1988, now Pat. No. 4,943,166, discloses one such information processing apparatus. In this apparatus, an optical disk is rotated on a turntable and an optical head is moved in the radial direction of the disk while directed at a specified track of the disk. On the selected track, the optical head records information or reproduces information from the optical disk. Generally, the optical head is supported by supporting means on a drive base to allow reciprocal movement in the radial direction of the optical disk. The supporting means includes a pair of guide shafts which are passed through bearings incorporated in the optical head. Both ends of each guide shaft are mounted on frames provided upright on the drive base.

The supporting means, however, is not made of insulating construction, and the optical head is not electrically insulated from the drive base. Thus, external noise may be transmitted from the drive base and the supporting means to the optical head and adversely affect the information processing operation.

SUMMARY OF THE INVENTION

Accordingly, it is an object of the present invention to provide an information processing apparatus which can safely prevent entry of external noise into the optical head and, thus, perform information processing more stably.

In order to achieve this object, an apparatus according to this invention comprises insulating means for electrically insulating the information processing head from the drive base.

According to this invention, the apparatus also has a main base supporting the drive base, and another insulating means for electrical insulation between the drive base and the main base.

BRIEF DESCRIPTION OF THE DRAWINGS

FIGS. 1 through 5 show an information processing apparatus according to an embodiment of this invention in which:

FIG. 1 is a perspective view showing the apparatus and an optical disc cartridge;

FIG. 2 is a perspective view showing a drive mechanism of the apparatus;

FIG. 3 is a side view of the drive mechanism;

FIG. 4 is a side view showing, on an enlarged scale, the connection between the optical head supporting mechanism and the drive base;

FIG. 5 is a sectional view taken along line V—V in FIG. 3; and

DETAILED DESCRIPTION OF THE PREFERRED EMBODIMENT

An embodiment of this invention will now be described with reference to the accompanying drawings.

Figure 1:
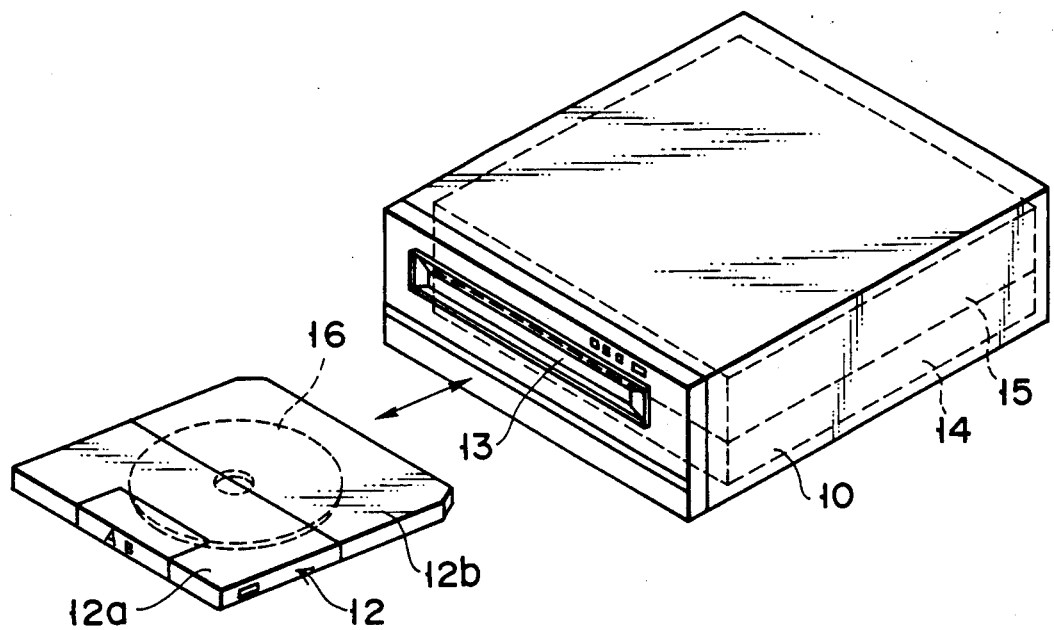

As is shown in FIG. 1, an information processing apparatus is provided with casing 10, at the front face of which cartridge loading slot 13 is formed. Casing 10 houses information processing mechanism 14, loading mechanism 15, and a control section, not shown, for controlling the operation of those mechanisms.

Cartridge 12 used with the information processing apparatus includes cases 12a, 12b and accommodates optical disk 16 as an information storage medium. When inserted through slot 13 into casing 10, cartridge 12 is loaded in processing mechanism 14 by loading mechanism 15, whereupon cases 12a, 12b of cartridge 12 are opened to expose the central part of disk 16. Then disk 16 is automatically mounted on a turntable of processing mechanism 14 to be described later.

Figure 2:
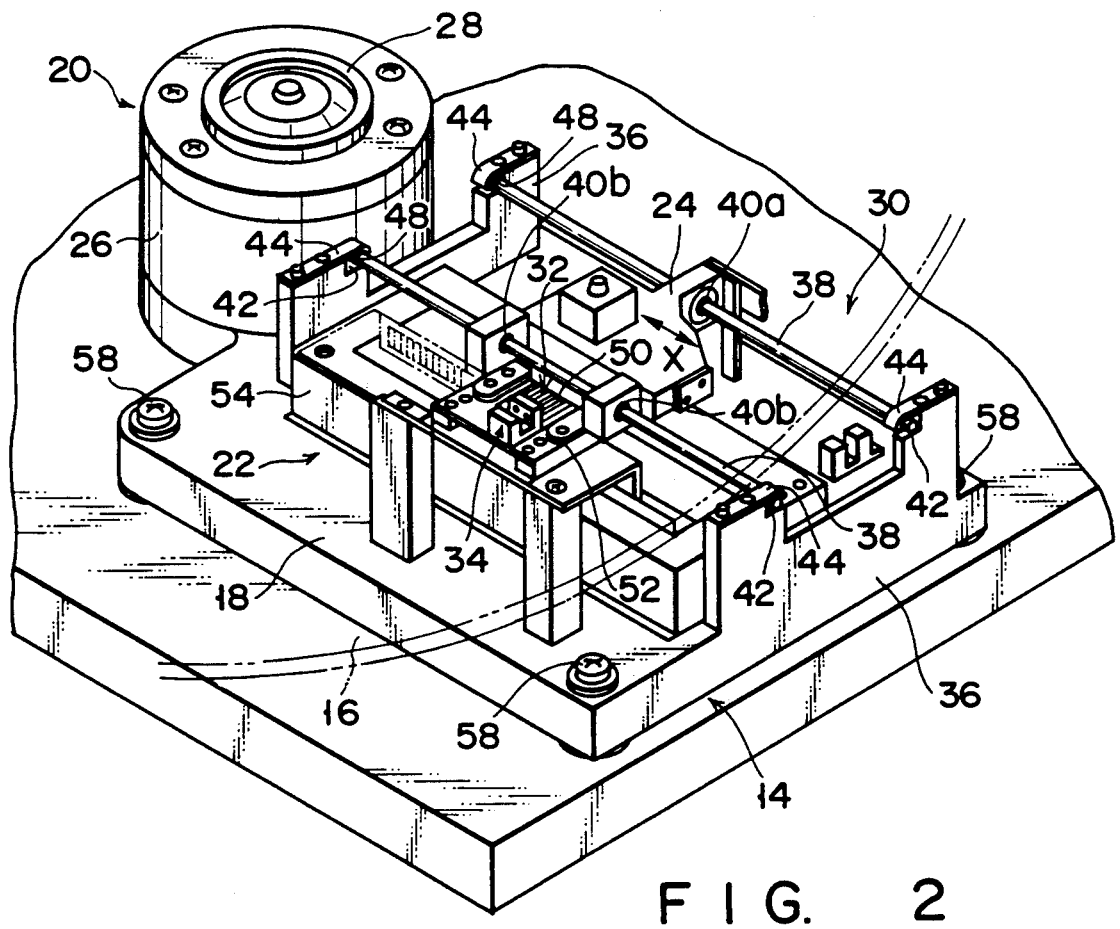
Figure 3:
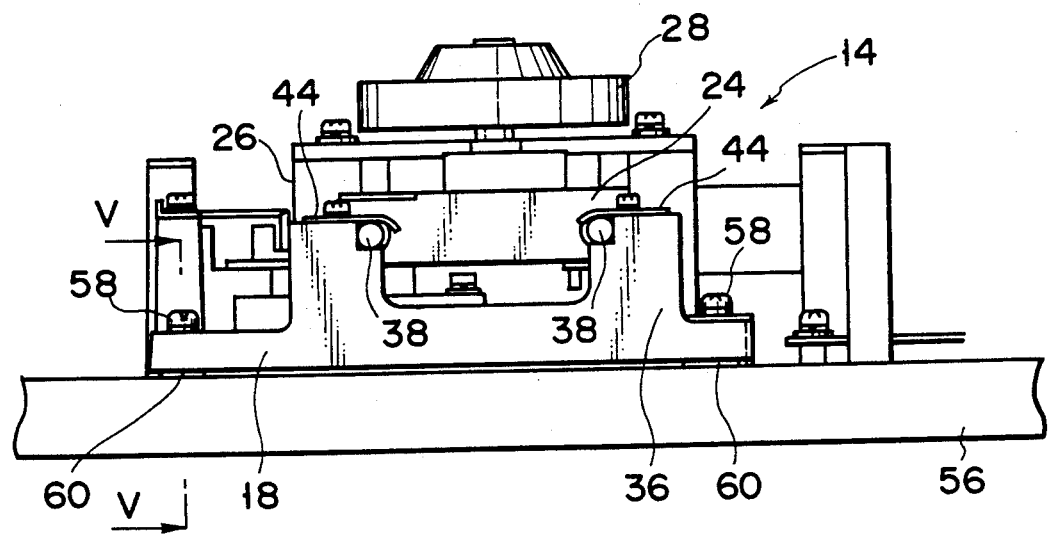

Referring to FIGS. 2 and 3, processing mechanism 14 comprises drive base 18 as a base board. On drive base 18 are provided rotary unit 20 for rotating disk 16 and head drive mechanism 22 for moving optical head 24 in the radial direction of disk 16. Head 24 records information on or reproduces information from disk 16. Rotary unit 20 includes spindle motor 26 fixed to drive base 18 and turntable 28 mounted on the motor spindle. Disk 16 is put on the turntable.

Head drive mechanism 22 comprises support mechanism 30 supporting head 24 to be reciprocable in the radial direction of disk 16, linear motor 32 for moving head 24 to a position where head 24 is directed to a specified track on the recording surface of disk 16, and detection unit 34 for detecting the location of head 24.

On drive base 18, a pair of support frames 36 are provided upright and facing each other. Each frame 36 is formed in a substantially U-shape. Support mechanism 30 comprises a pair of guide shafts 38 supported by frames 36 and extending parallel to each other in the radial direction of disc 16. Head 24 includes a single bearing 40a and a pair of bearings 40b. One of guide shafts 30 is passed through bearing 40a and the other is passed through bearings 40b.

Figure 4:
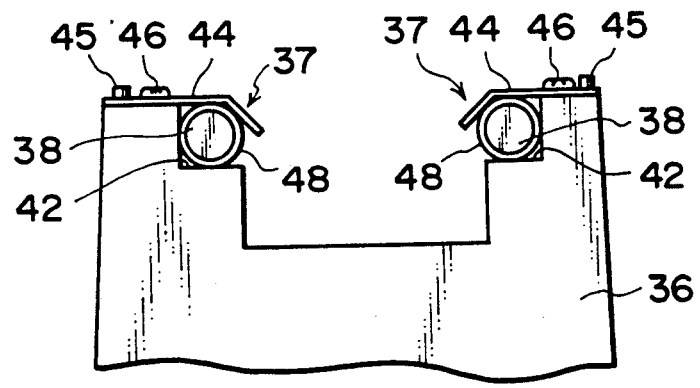

As is shown by FIGS. 2 through 4, each frame 36 has a pair of L-shaped notches 42 which face each other at a specified distance. Both ends of each guide shaft 38 are fitted into the corresponding notches 42 of frames 36 and positioned thereby. The end portions of each guide shaft 38 are pressed against the corresponding notches 42 by plate springs 44 fixed to frames 36, and are held therein. Each plate spring 44 is fitted onto positioning pin 45 protruding from frame 36 and secured by screw 46 to the frame.

As is clear from FIG. 4, either end of each guide shaft 38 is wound with insulatinq tape 48, such as a resin tape having a thickness of about 20 μm. Each end of guide shafts 38 is in contact with the inner surfaces of notch 42 and plate spring 44 via insulating tape 48. Thus, guide shafts 38 do not directly contact frames 36 and plate springs 44 and, therefore, are not electrically connected to drive base 18. In other words, insulating tapes 48 electrically isolate guide shafts 38 from frames 36 and, thus, constitute insulating means 37 for preventing external noise from being transmitted to optical head 24 by passing through drive base 18, frames 36, and guide shafts 38.

Linear motor 32 includes bobbin 52 coupled to head 24 and wound with coil 50, and magnet 54 mounted on drive base 18 opposite the bobbin. When electricity is supplied to coil 50, head 24 together with bobbin 52 is reciprocated in the direction of arrow X, that is, in the radial direction of disc 16.

Figure 5:
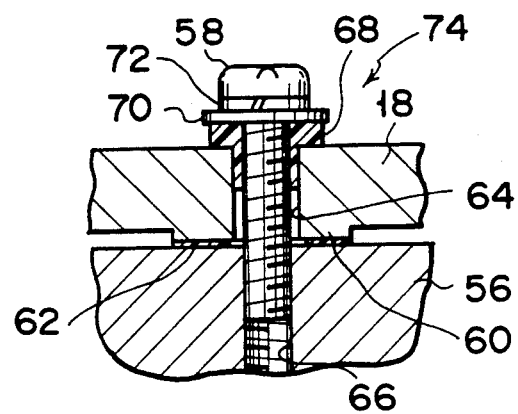

As is shown in FIGS. 2, 3 and 5, drive base 18 and loading mechanism 15 are mounted on main base 56 and secured thereto by four screws 58. Drive base 18 has four round support portions 60 protruding from the bottom surface thereof and is mounted on main base 56 via those support portions. Therefore, there is a gap between the bottom surface of drive base 18 and the top surface of main base 56. Insulating seal 62 having a through-hole in the center thereof is interposed between each support portion 60 and main base 56. Drive base 18 has four through-holes 64 each extending through support portion 60. Main base 56 has four threaded holes 66 formed coaxially with the corresponding through-holes 64. Flanged insulating collars 68 are fitted in through-holes 64, respectively. Screws 58, each fitted with a plain washer 70 and spring washer 72, are screwed into threaded holes 66 of main base 56 through collars 68 and through-holes 64, respectively. By this method, drive base 18 and main base 56 are completely insulated from each other electrically by insulating seals 62 and insulating collars 68. Thus, seals 62 and collars 68 constitute second insulating means 74 for preventing external noise from being transmitted from main base 56 to drive base 18.

With an information processing apparatus having the construction as described above, insulating means 37 electrically insulates optical head 24, for recording and reproducing information on and from optical disc 16, from drive base 18. Therefore, it is possible to prevent external noise from being transmitted through drive base 18 to head 24 and to thereby greatly improve the signal-to-noise ratio of input and output signals of the optical head. As a result, stable information processing can be obtained.

Owing to the second insulating means between drive base 18 and main base 56, which prevents external noise from passing from the main base to the drive base, the external noise, which would otherwise go to optical head 24, can be further eliminated, thus making possible information processing with even higher reliability.

The following advantage can be provided by the above embodiment in which insulating means 37 is constituted of insulating tape 48. In assembling an apparatus, after guide shafts 38 have been passed through bearings 40a and 40b, insulating tape 48 can be fitted on the guide shafts, thus facilitating assembly. To enable the optical head to be positioned with high accuracy to the optical disc, guide shafts 38 are inserted into bearings 40a and 40b with no play. As a result, when guide shafts 38 are to be inserted into the bearings after insulating portions have been formed on the guide shafts, the obstructive insulating portions make it difficult to insert the guide shafts into the bearings.

This invention is not limited to the above preferred embodiment but may be embodied in various forms within the scope of this invention.

For example, the ends of the guide shafts may be covered with an insulating material instead of insulating tape. For the ease of assembly, it is desirable to cover the ends of the guide shafts with an insulating material after inserting the guide shafts into the bearings of the optical head.

Figure 6:
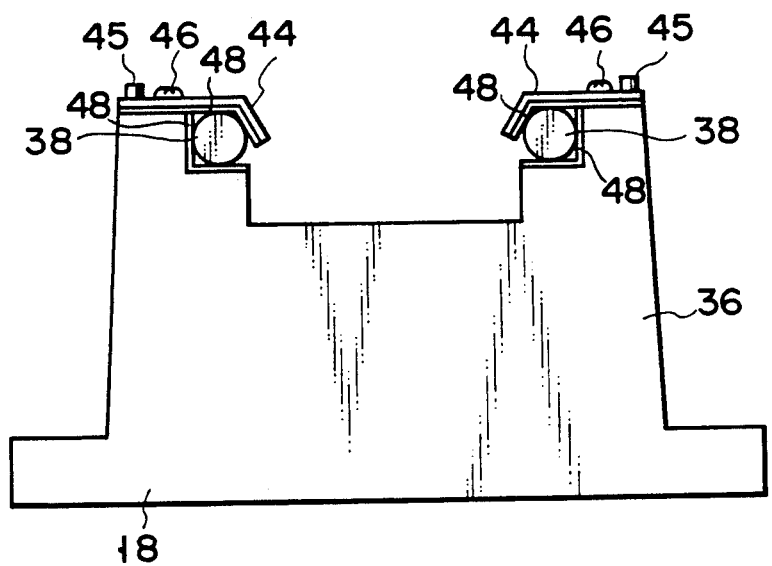
FIG. 6 is a side view corresponding to FIG. 4 and shows a modified embodiment of this invention.

Also, as shown in FIG. 6, insulating tape 48 may be attached, instead of to guide shafts 38, to the inner surface or the surface in contact with the guide shaft of plate springs 44 and also to the inner surfaces of notches 42. With this construction, the same advantage as in the above embodiment can be obtained.

What is claimed is:

1. An apparatus for processing information on an optical disk, comprising:
    a first base;
    optical head means for directing a light beam onto the optical disk and receiving the light beam reflected from the disk to generate an information signal;
    means for supporting the optical head means to be movable in the radial direction of the optical disk, said supporting means including guide shafts, bearing means on the optical head means for slidably engaging said guide shafts, and support members on the base to support the ends of the guide shafts;
    first insulating means for electrically insulating the optical head means from the base to prevent external noise from being transmitted to the optical head means through the base, said first insulating means being arranged between the ends of the guide shafts and the corresponding support members;
    a second base on which said first base is secured by a plurality of fixing members passing through the first base and screwed into the second base; and
    second insulating means for electrically insulating the base from the main base to prevent external noise from being transmitted from the second base to the first base, said second insulating means includes first insulating members interposed between the first base and the second base, and second insulating members interposed between the fixing members and the first base.

2. An apparatus according to claim 1, wherein said insulating means includes a thin first insulating tape attached to the support members.

3. An apparatus according to claim 1, wherein said first insulating means includes a thin insulating tape wound around each end of the guide shafts.

* * * * *